United States Patent
Katsaros et al.

(10) Patent No.: US 10,432,491 B2
(45) Date of Patent: Oct. 1, 2019

(54) CONTROL DEVICE FOR ESTIMATION OF POWER CONSUMPTION AND ENERGY EFFICIENCY OF APPLICATION CONTAINERS

(71) Applicant: Intel Corporation, Santa Clara, CA (US)

(72) Inventors: Grigorios Katsaros, London (GB); Perumal Kuppuudaiyar, Dublin (IE); Suryanarayanan Natarajan, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 15/077,398

(22) Filed: Mar. 22, 2016

(65) Prior Publication Data

US 2017/0279697 A1    Sep. 28, 2017

(51) Int. Cl.
*G06F 15/173* (2006.01)
*H04L 12/26* (2006.01)
*H04L 12/24* (2006.01)

(52) U.S. Cl.
CPC ........ *H04L 43/0876* (2013.01); *H04L 41/142* (2013.01); *H04L 41/145* (2013.01); *H04L 41/5009* (2013.01); *H04L 43/0817* (2013.01); *Y02D 10/34* (2018.01)

(58) Field of Classification Search
CPC ............ H04L 43/0876; H04L 43/0817; H04L 41/5009; H04L 41/142; H04L 41/145; Y02D 10/34
See application file for complete search history.

(56) References Cited

U.S. PATENT DOCUMENTS

| 9,170,916 B2 | 10/2015 | Dalton et al. |
| 9,264,334 B1 | 2/2016 | Brandwine |
| 2003/0028642 A1* | 2/2003 | Agarwal .................. H04L 67/20 709/226 |

(Continued)

FOREIGN PATENT DOCUMENTS

| CN | 103034525 A | 4/2013 |
| WO | 2011106725 | 9/2011 |
| WO | WO-2017165003 | 9/2017 |

OTHER PUBLICATIONS

"International Application Serial No. PCT/US2017/016892, International Search Report dated May 23, 2017", 3 pgs.

(Continued)

*Primary Examiner* — Richard G Keehn
(74) *Attorney, Agent, or Firm* — Schwegman Lundberg & Woessner, P.A.

(57) ABSTRACT

Devices and techniques for estimating power consumption and efficiency of application containers configured to run on a server system, such as a cloud server, are provided. In an example, a method can include creating a benchmark application container, naming the benchmark application container on a host server, collecting power consumption information of the host server, collecting resource utilization information of the benchmark application container using an artificial workload, building a statistical model using the power consumption information and the resource utilization information, and generating a first power model of the host server.

14 Claims, 5 Drawing Sheets

(56) References Cited

U.S. PATENT DOCUMENTS

| | | | |
|---|---|---|---|
| 2007/0260843 A1* | 11/2007 | Creamer | G06F 11/3428 |
| | | | 711/170 |
| 2009/0287432 A1* | 11/2009 | Fausak | H04B 3/48 |
| | | | 702/60 |
| 2010/0031259 A1 | 2/2010 | Inoue | |
| 2010/0318828 A1 | 12/2010 | Elting et al. | |
| 2011/0213997 A1 | 9/2011 | Kansal et al. | |
| 2012/0101799 A1* | 4/2012 | Fernandes | G06F 11/3414 |
| | | | 703/21 |
| 2014/0047341 A1 | 2/2014 | Breternitz et al. | |
| 2016/0330138 A1* | 11/2016 | Thomason | H04L 67/10 |
| 2017/0177860 A1* | 6/2017 | Suarez | G06F 21/53 |
| 2017/0177877 A1* | 6/2017 | Suarez | G06F 21/577 |
| 2017/0180346 A1* | 6/2017 | Suarez | G06F 9/45558 |
| 2017/0220719 A1* | 8/2017 | Elrabaa | G06F 17/5009 |

OTHER PUBLICATIONS

"International Application Serial No. PCT/US2017/016892, Written Opinion dated May 23, 2017", 6 pgs.

"America's Data Centers Consuming and Wasting Growing Amounts of Energy", Natural Resources Defense Council, [Online]. [Accessed Nov. 4, 2015]. Retrieved from the Internet: <URL: www.nrdc.org/energy/data-center-efficiency-assessment.asp>, (2015), 2 pgs.

"Build, Ship, and Run any App, Anywhere", Docker, [Online]. [Accessed Nov. 13, 2015]. Retrieved from the Internet: <URL: https://www.docker.com/>, 7 pgs.

"Engine API v1.18", Docker Documentation, [Online]. Retrieved from the Internet: <URL: https://docs.docker.com/reference/api/docker_remote_api_v1.18/>, (Accessed on Jul. 25, 2017), 46 pgs.

"GNU FreeIPMI", FreeIPMI, [Online]. [Archived Nov. 6, 2015]. Retrieved from the Internet: <URL: http://www.gnu.org/software/freeipmi/index.html>, (2014), 2 pgs.

"Intelligent Platform Management Interface (IPMI)", Intel, [Online]. Retrieved from the Internet: <URL: Intelligent Platform Management Interface (IPMI)>, (Accessed on Jul. 25, 2017), 2 pgs.

Haque, MD E, et al., "Providing Green SLAs in High Performance Computing Clouds", Department of Computer ScienceRutgers University, Piscataway, NJ 08854-8019, (2013), 11 pgs.

Husain Bohra, Ata E, et al., "VMeter: Power Modelling for Virtualized Clouds", Department of Computer Science and Engineering,University at Buffalo, State University of New York, New York, U.S.A., (2010), 8 pgs.

Kansal, Aman, et al., "Virtual Machine Power Metering and Provisioning", SoCC'10, Jun. 10-11, 2010, Indianapolis, Indiana, USA. ACM 978-1-4503-0036-0/10/06, (Jun. 2010), 12 pgs.

Katsaros, Gregory, et al., "A service framework for energy-aware monitoring and VM management in Clouds", Future Generation Computer Systems 29, (2012), 15 pgs.

Ramachaandran, Hari, et al., "Whitepaper: Data Center Manageability Interface (DCMI) Specification", Intel, (Aug. 2008), 11 pgs.

Von Laszewski, Gregor, et al., "Greenit Service Level Agreements", P. Wieder et al. (eds.), Grids and Service-Oriented Architectures for Service Level Agreements, DOI 10.1007/978-1-4419-7320-7_8, Springer Science+Business Media, LLC 2010, (2010), 77-88.

"Australian Application Serial No. 2017237704, First Examination Report dated May 17, 2019", 4 pgs.

"European Application Serial No. 17770756.6, Extended European Search Report dated Jul. 15, 2019", 8 pgs.

\* cited by examiner

CONTROL DEVICE FOR ESTIMATION OF POWER CONSUMPTION AND ENERGY EFFICIENCY OF APPLICATION CONTAINERS

BACKGROUND

Evolution of cloud computing during the last years and the incorporation of container technologies into the modern Software Defined Infrastructures (SDIs) of cloud Data Centers (DCs) has strengthened the adoption of containerized, micro-services-based applications. In that context, the enormous growth of DCs has had a great impact on power consumption. Ongoing efforts have been made to increase the efficiency of DCs by using low power hardware, introducing new DC building specifications, and using smarter cooling systems, among other initiatives. This effort has also resulted in the creation of Green Service Level Agreements (SLAs) as the contractual agreements between Service Providers (SP) and customers that incorporate energy efficiency guarantees. Ongoing efforts are directed to providing power consumption and efficiency estimations in the granularity of the application deployment for purposes related to Green Service Level Agreements is a challenging task.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To address these and other concerns, embodiments provide methodologies and tools that can allow SPs and DC owners to capture the energy impact of an application at the deployment level. In certain examples, the methodologies and tools can provide an SP with power efficiency characteristics of an application and can allow the SP to optimize a service deployment, detect problematic services or infrastructure components, and realize a power-aware service assurance mechanism. In addition, such capabilities can allow the energy profiling of deployed application stacks on servers with different configurations, wherein such different configurations can include configurations in processor usage. Such profiles can allow selection of the most appropriate hardware for a given SLA. Currently, enemy-related initiatives focus on the hardware layers of the server or Virtual Machines rather than containerized applications. Containerized applications differ from virtual machines in many ways. A high-level difference is the ability for many more container application to run on a server than for corresponding applications running in a virtual machine on the server. Virtual Machines can take up a lot of system resources. Each virtual machine runs not only a full copy of an operating system, but a virtual copy of all the hardware that the operating system needs to run. This can quickly add up to a lot of memory and processor utilization. In contrast, a container only utilizes enough of an operating system, supporting programs and libraries, and system resources to run a specific program. This particular difference generally means a single server can host two to three times as more containerized applications than applications naming on hosted virtual machines.

Operational efficiency is one of main performance indicators in cloud computing, and is largely is influenced by utilization of data center resources. Until recently, the computational unit and execution environment of cloud computing was the Virtual Machine (VM). VMs can take full advantage of ring-1 hardware isolation provided by various technologies to achieve robust resource isolation and security. Thus, VMs can load a full OS with its own memory management. To this end, the power consumption of a cloud VM is relevant to the workload that the VM is handling. In terms of resources utilization, that workload can be quantified in terms of resource utilization of the CPU, Disk I/O, and memory utilization by the computing unit, among other parameters.

The present inventors have realized a method and system for estimating power consumption and efficiency of a container operating in a cloud server system such that service providers can develop application profiles and resource management tools that will facilitate the service provisioning process of certain data centers. In addition, the power consumption information can enable foundation and assurance of an application or group of applications within or beyond a particular Green SLA.

Figure 1:
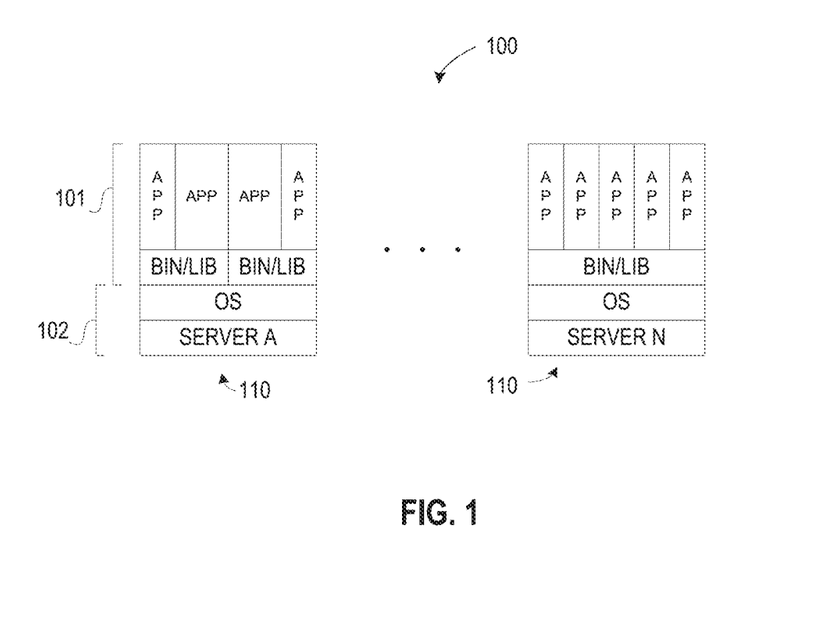
FIG. 1 illustrates generally an example of a cloud server system in accordance with some embodiments.

FIG. 1 illustrates generally an example cloud server system 100 in accordance with some embodiments. In certain examples, the server system 100 can include a number of server nodes 110 (SERVER A, . . . , SERVER N) with each node having an operating system (OS). In certain examples, each node 110 can run one or more application containers 101. In some examples, binary files (BIN) and library files (LIB) of an application container 101 can assist the application (APP) to interface with the operating system (OS) of the host (SERVER X). In certain examples, two or more application containers can share a library or binary file. The applications (APP), either alone or in combination with one another, can provide clients of the cloud server system 100 with a variety of services. Some services can be provided through an application running in an application container 101. Services can include, but are not limited to, e-mail, simulations, rendering, business applications, storage, etc.

Figure 2:
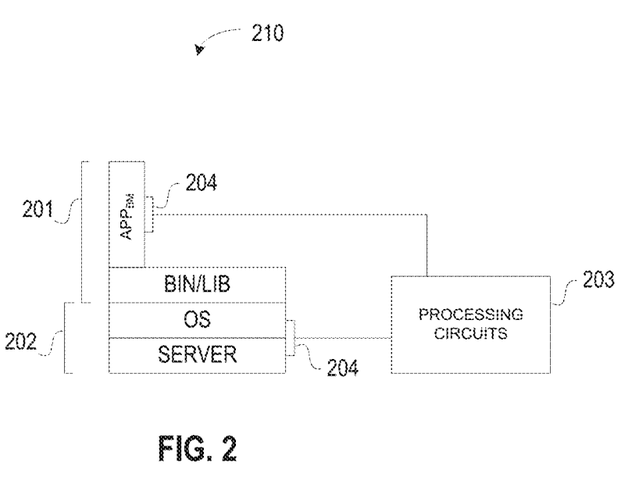
FIG. 2 is a block diagram of a host server node for benchmarking and estimating energy impact and efficiency of an application container in accordance with some embodiments.

FIG. 2 illustrate generally an example host server node 210 for benchmarking and estimating energy impact and efficiency of an application container 201 in accordance with some embodiments. The host server node 210 can include a host server 202, a benchmark application container 201, a control device including processing circuitry 203 and one or more interfaces 204 to the application container 201 and the host server 202. During a benchmarking phase, the benchmark application container instance can be run on the host server 202. In certain examples, the benchmark application container instance can stress the container using an artificial workload. The artificial workload can automatically provide requests to the application that represent real-time requests the application is predicted to respond to when the server is installed. The one or more interfaces 204 can communicate with the application container 201 and the host server 202 and can collect power consumption information and utilization information, such as resource utilization information. From the collected benchmark information, a statistical model, such as a regression model, can be constructed and analyzed. The statistical or regression analysis can provide or generate an initial power model for the host server 202. In certain examples, the power consumption information can include power consumption of the host server 202 with no container and power consumption of the host server 202 with the benchmark container 201. In certain examples, the resource utilization information can include utilization information of the benchmark container 201 interaction with the host server 202. For a particular application ($P_{app}$), power consumption at any point in time can include the sum of the power consumption of one or more services of the application deployed in the containers ($P_C$):

$$P_{app}(t) = \Sigma P_C. \quad \text{(Eq. 1)}$$

Figure 3:
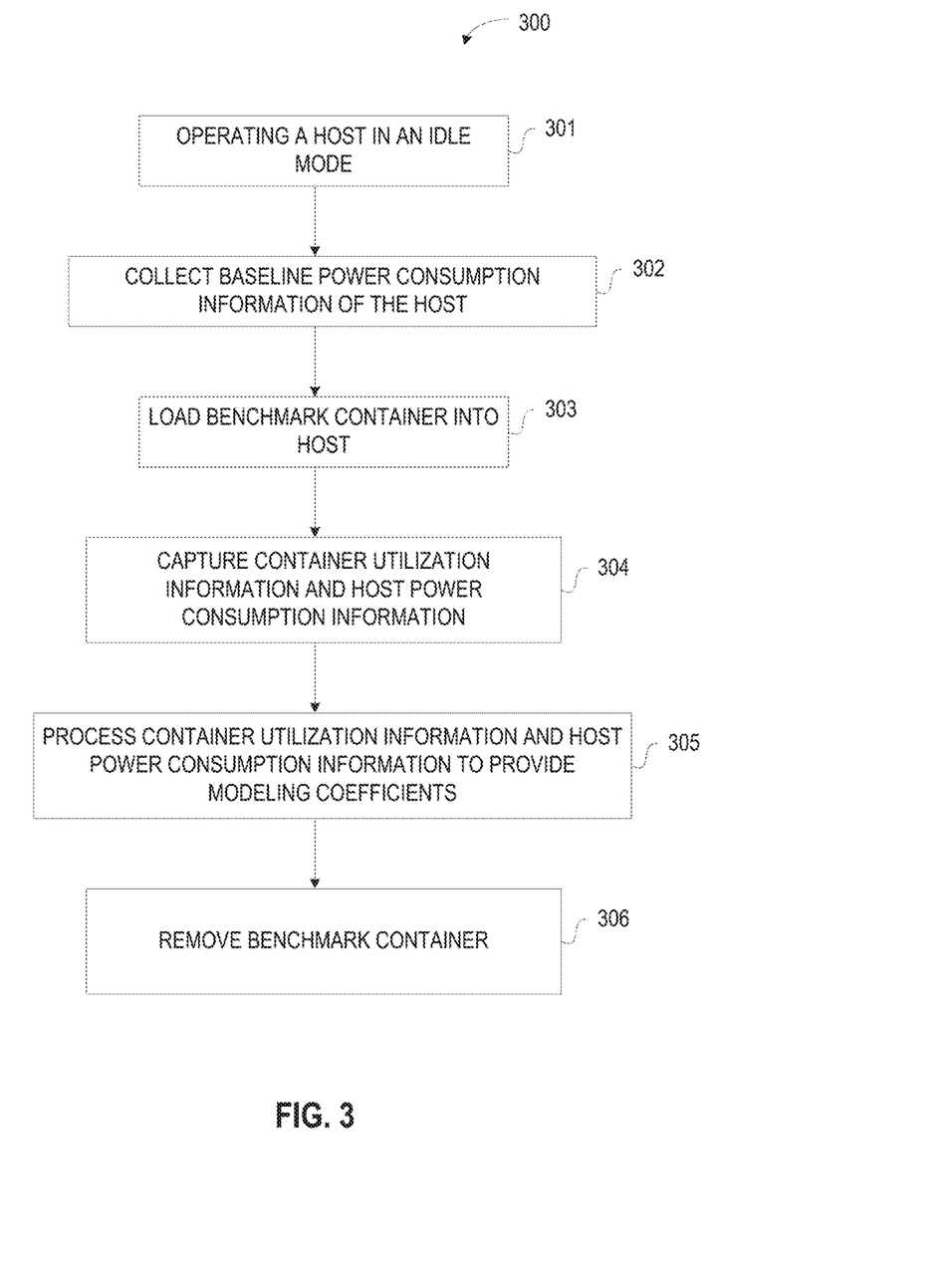
FIG. 3 illustrates general a flow chart of an example of a method for container power modeling on a host server node in accordance with some embodiments.

FIG. 3 illustrates general a flow chart of an example of a method for container power modeling on a host server node in accordance with some embodiments. The method can include at 301, an estimation system operating a host in an idle mode or without a container. At 302, the estimation system can collect stand-by or base line power consumption information of the host for example by using a Data Center Manageability Interface (DCMI) and Intelligent Platform Management Interface (IPMI). At 303, the system can load a benchmark container onto an empty host. In certain examples, the benchmark container instance can include an artificial workload, or the system can apply an artificial workload to the benchmark container instance. At 304, the system can capture or collect container resource utilization information and host power consumption information via the DCMI or IPMI. At 305, the system can operate on or process the collected information, for example, by performing regression or some other statistical analysis, to provide initial factors or coefficients for a power model of a container running on the host. In certain examples, the algorithm for providing the initial power factor or coefficients are discussed below. In certain examples, at 306, the benchmark container can be removed from the host in preparation for an actual implementation of the host in, for example, a cloud server. In certain examples, the utilization information received from the benchmark application can allow estimation for power consumption of the container. For example, the utilization information can include CPU utilization information ($U_{CPU}$) that can be indicative of the container's use of one or more central processing units (CPUs) of the host. In certain examples, the utilization information can include disk utilization information ($U_{Disk}$) that can be indicative of the container's accessing a disk of the host. In certain examples, the utilization information can include memory utilization information ($U_{Mem}$) that can be indicative of the container's accessing memory of the host.

For a container instance deployed on a certain host machine, the power consumption can be estimated as a model of the individual resource utilizations of the CPU, disk I/O and memory (UCPU, UDisk, UMem). In that context, the elements of the estimate are the amount of power that relates to the CPU utilization, the memory consumption and the disk operations. Thus, building a regression model using the power consumption information and the resource utilization information can include using the coefficients of the power model of the host server to estimate the power consumption of a real-time container application of a plurality of real-time container applications running on the host server. In certain examples, the estimate of the power consumption ($P_{Ci}$) of the real-time container application is:

$$P_{Ci} = a_{CPU}U_{CPU\_Ci} + b_{Disk}U_{Disk\_Ci} + c_{Disk}U_{Mem\_Ci} + d\frac{P_H}{n}, \quad \text{(Eq. 2)}$$

where i is an index associated with the real-time container application of the plurality of real-time container applications, n is the number of real-time container applications running on the host, and $P_H$ is the idle power of the host.

The coefficients (a, b, c, and d) can be weights defined through the benchmarking phase and a linear regression or other statistical learning process. A training/learning phase can be performed by using a benchmark container that stresses the host with CPU, memory and disk workload. After capturing the resource utilization of the CPU, disk operations and memory utilization of the benchmark container, as well as the power consumption of the host machine, regression modeling can allow for an estimate of the coefficients by replacing known elements in the following equation, $$P_{Host} = a_{CPU}U_{CPU\_CB} + b_{Disk}U_{Disk\_CB} + c_{Disk}U_{Mem\_CB} + dP_0, \quad \text{(Eq. 3)}$$

where $P_{Host}$ is the measured power consumption of the host running the benchmark container, $U_{CPU\_CB}$, $U_{Disc\_CB}$ and $U_{Mem\_CB}$ are resource utilization values received from an interface to the container and/or the host, and $P_0$ is the idle power consumption of the host. Once the weights or coefficients are determined, they can be used in Eq. 2 to allow for determining an estimate of power consumption of a container during runtime. During runtime, refinement of the coefficients can further take place by comparing the estimated power of each container with the measured power of the host and reconciling the measurements with the understanding that, $$P_{Host} = \Sigma_1^n P_{Ci} \quad \text{(Eq. 4)}$$

Having provided and refined power estimates for each container, the system can then provide a measure of container energy efficiency. The calculation of the energy efficiency profile of a container instance follows the general definition of efficiency:

$$\text{useful\_work/power\_consumed.} \quad \text{(Eq. 5)}$$

While each container instance can have has a focused task with distinctive input and output parameters, a generic metric for the depiction of the useful operations may not be able to be defined. To this end, each service provided by each containerized application can have its own metrics for the rate of efficiency. The energy efficiency of container instances with the same operational objectives can be compared to each other. For example, if a database server is hosted in a container, the enemy efficiency of that container instance can be calculated as number of transactions per kilowatt-hour (kWh). On the other hand, for a rendering process hosted in a container, the energy efficiency can be measured in rendered megabytes per kWh. For a distributed containerized application ($f_{Ci}$), the energy efficiency (E) can be estimated as:

$$Ef_{Ci} = \frac{\text{useful\_operations}_{t1-t2}}{\int_{t2}^{t1} P_c(t)}, \qquad \text{(Eq. 6)}$$

where $P_C$ is the power consumed over an interval of time from t1 to t2 and the system includes an interface to collect an indicator of useful operations, or application-specific operations (useful_operations), associated with and performed by the application over the corresponding interval.

Some embodiments use various tools to provide information for measuring power consumption and resource utilization. Such tools can include interfaces that can see the control groups and namespaces of Docker Engine, a container platform for building, shipping, and running distributed containerized applications. Other tools for collecting power consumption or resource utilization information can include Data Center Manageability Interface (DCMI) and intelligent Platform Management Interface (IPMI) such as FreeIPMI. In certain examples, construction of the power model can be done with power information gathered through inn programmatic interfaces and not from Power Distribution Units (PDUs) because IPMI interfaces can provide better power consumption information of individual applications that a PDU can not provide.

Figure 4:
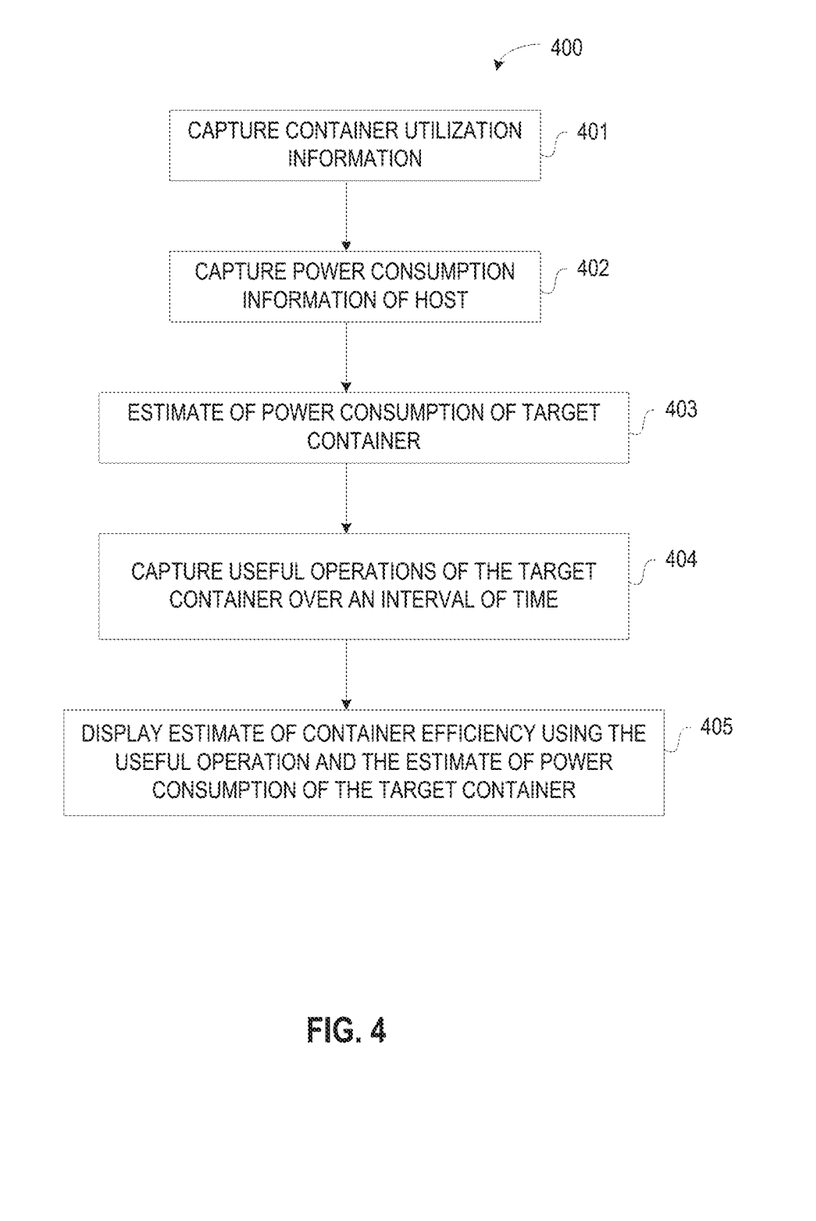
FIG. 4 illustrates generally an example of a method for providing an efficiency estimate of a container running on a server system in accordance with some embodiments.

FIG. 4 illustrates generally an example of a method for providing an efficiency estimate of a container running on a server system. At 401, an estimation system can capture container utilization information from the host server or the target container using an interface. At 402, the estimation system can capture power consumption information of the host server. At 403, the estimation system can use the container utilization information, the power consumption information and a power consumption model having pre-defined coefficients to provide an estimate of power consumption of the target container. At 404, the estimation system can capture and count the number of useful operations of the target container over an interval of time. At 405, the estimation system can display an estimate of container efficiency for the target container. The estimate can be based on the accumulated number of useful operations performed by the container divided by the power consumed by the container during the interval of time.

Figure 5:
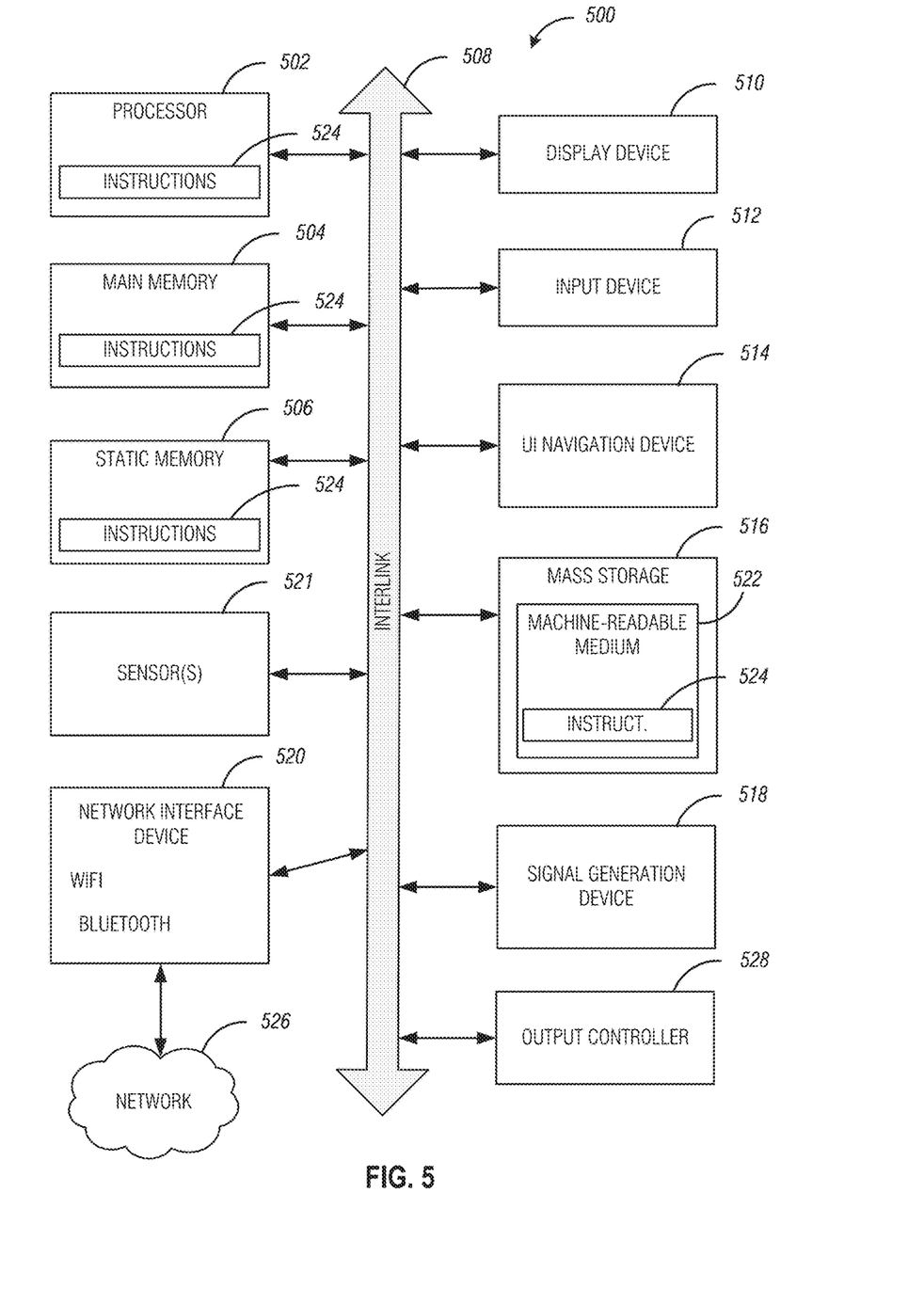
FIG. 5 illustrates a block diagram of an example machine upon which any one or more of the techniques (e.g., methodologies) discussed herein may perform.

FIG. 5 illustrates a block diagram of an example machine 500 upon which any one or more of the techniques (e.g., methodologies) for providing and displaying estimates of application container power consumption or application container efficiency discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets (also known as a group of circuits or circuit groups) are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, controller, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired, or wireless (e.g., infrared (IR), NFC, etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc. Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, Bluetooth (1.0, 2.0, 3.0, 4.0 (BLE)), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

In Example 1, a control device can include a first interface to a host server, a second interface to one or more application containers running on the host server, and processing circuitry. The processing circuitry can be configured to apply an artificial workload to a benchmark application container, to collect power consumption information of the host server, to collect resource utilization information of the benchmark application container, to build a regression model using the power consumption information and the resource utilization information, and to generate a first power model of the host server.

In Example 2, a first application container of the one or more application containers of Example 1 optionally is a benchmark application container.

In Example 3, the resource utilization information of any one or more of Examples 1-2 optionally includes central processor utilization information (UCPU) of the host server while naming the benchmark application container.

In Example 4, the resource utilization information of any one or more of Examples 1-3 optionally includes disk input and output utilization information (UDisk) of the host server while running the benchmark application container.

In Example 5, the resource utilization information of any one or more of Examples 1-4 optionally includes memory utilization information (UMem) of the host server while running the benchmark application container.

In Example 6, the processing circuitry of any one or more of Examples 1-5 optionally is further configured to estimate coefficients of the first power model for the host server using the central processor utilization information (UCTU), disk input and output utilization (UDisk) and the memory utilization information (UMem) while building the regression model.

In Example 7, a second application container one or more application containers of any one or more of Examples 1-6 optionally is a real-time application container.

In Example 8, the processing circuitry of any one or more of Examples 1-7 optionally is further configured to estimate the power consumption of the real-time application container running on the host server using the coefficients of the first power model, wherein the estimate of the power consumption (PCi) of the real-time application container is:

$$P_{Ci} = a_{CPU}U_{CPU\_Ci} + b_{Disk}U_{Disk\_Ci} + c_{Disk}U_{Mem\_Ci} + d\frac{P_H}{n},$$

wherein i is an index associated with the real-time container application of a plurality of real-time container applications, n is the actual number of real-time container applications running on the host and $P_H$ is the idle power of the host.

In Example 9, the processing circuitry of any one or more of Examples 1-8 optionally is further configured to collect an indicator of useful operations (useful_operations) performed by the real-time application container over an interval of time (t1–t2) using the second interface.

In Example 10, the processing circuitry of any one or more of Examples 1-9 optionally is further configured to provide an efficiency (E) of the real-time application container ($f_{Ci}$) using the estimate of the power consumption ($P_{Ci}$) and the indicator of useful operations, wherein $$Ef_{Ci} = \frac{\text{useful\_operations}_{t1-t2}}{\int_{t2}^{t1} P_c(t)}.$$

In Example 11, a machine-readable medium including instructions for estimating power consumption of a cloud computing application that, when executed on a machine cause the machine to perform operations including running a benchmark application container on a host server, collecting power consumption information of the host server, collecting resource utilization information of the benchmark application container using an artificial workload, building a regression model using the power consumption information and the resource utilization information, and providing a first power model of the host server.

In Example 12, the machine-readable medium of any one or more of Examples 1-11 optionally includes instructions that, when executed on the machine, cause the machine to collect the resource utilization information by perforating operations including collecting central processor utilization information ($U_{CPU}$) of the host running the benchmark application container.

In Example 13, the machine-readable medium of any one or more of Examples 1-12 optionally includes instructions that, when executed on the machine, cause the machine to collect the resource utilization information by performing operations including collecting disk input and output utilization information ($U_{Disk}$) of the host running the benchmark application container.

In Example 14, the machine-readable medium of any one or more of Examples 1-13 optionally includes instructions that, when executed on the machine, cause the machine to collect the resource utilization information by performing operations including collecting memory utilization information ($U_{Mem}$) of the host running the benchmark application container.

In Example 15, the machine-readable medium of any one or more of Examples 1-14 optionally includes instructions that, when executed on the machine, cause the machine to build the regression model using the power consumption information and the resource utilization information by perforating operations including estimating coefficients of a power model for the host using the central processor utilization information ($U_{CPU}$), disk input and output utilization ($U_{Disk}$) and the memory utilization information ($U_{Mem}$).

in Example 16, the machine-readable medium of any one or more of Examples 1-15 optionally includes instructions that, when executed on the machine, cause the machine to perform operations including provide an estimate of the power consumption of a real-time container application of a plurality of real-time container applications running on the host server using the coefficients of the power model of the host server, wherein the estimate of the power consumption ($P_{Ci}$) of the real-time container application is:

$$P_{Ci} = a_{CPU}U_{CPU\_Ci} + b_{Disk}U_{Disk\_Ci} + c_{Disk}U_{Mem\_Ci} + \frac{P_H}{n},$$

wherein i is an index associated with the real-time container application of the plurality of real-time container applications, n is the actual number of real-time container applications running on the host and $P_H$ is the idle power of the host.

In Example 17, the machine-readable medium of any one or more of Examples 1-16 optionally includes instructions that, when executed on the machine, cause the machine to perform operations including collecting an indicator of useful operations (useful_operations) performed by a real-time application container over an interval of time (t1–t2).

In Example 18, the machine-readable medium of any one or more of Examples 1-7 optionally includes instructions that, when executed on the machine, cause the machine to perform operations including providing an efficiency (E) of the real-time application container ($f_{Ci}$) using the estimate of the power consumption ($P_{Ci}$) and the indicator of useful operations, wherein $$Ef_{Ci} = \frac{\text{useful\_operations}_{t1-t2}}{\int_{t2}^{t1} P_c(t)}.$$

In Example 19, a method for estimating power consumption of a cloud computing application can include running a benchmark application container on a host server, collecting power consumption information of the host server, collecting resource utilization information of the benchmark application container using an artificial workload, building a regression model using the power consumption information and the resource utilization information, and generating a first power model of the host server using the regression model.

In Example 20, the collecting the resource utilization information of any one or more of Examples 1-19 optionally includes collecting central processor utilization information ($U_{CPU}$) of the host server running the benchmark application container, collecting disk input and output utilization information ($U_{Disk}$) of the host server running the benchmark application container, and collecting the resource utilization information includes collecting memory utilization information ($U_{Mem}$) of the host server running the benchmark application container.

In Example 21, building a regression model using the power consumption information and the resource utilization information of any one or more of Examples 1-20 optionally includes estimating coefficients of a power model for the host server using the central processor utilization information ($U_{CPU}$), disk input and output utilization ($U_{Disk}$) and the memory utilization information ($U_{Mem}$), and using the coefficients of the power model of the host server to estimate the power consumption of a real-time container application of a plurality of real-time container applications running on the host server, wherein the estimate of the power consumption ($P_{Ci}$) of the real-time container application is:

$$P_{Ci} = a_{CPU}U_{CPU\_Ci} + b_{Disk}U_{Disk\_Ci} + c_{Disk}U_{Mem\_Ci} + \frac{P_H}{n},$$

wherein i is an index associated with the real-time container application of the plurality of real-time container applications, n is the actual number of real-time container applications running on the host server and $P_H$ is the idle power of the host server.

In Example 22, the method of any one or more of Examples 1-21 optionally includes collecting an indicator of useful operations performed by a real-time application container over an interval of time, and determining an efficiency of the real-time container application using the estimate of the power consumption ($P_{Ci}$) and the indicator of useful operations.

In Example 23, a controller for estimating power consumption of a cloud computing application can include means for collecting power consumption information of a host server, means for collecting resource utilization information of a benchmark application container running on the host server, means for building a regression model using the power consumption information and the resource utilization information, and means for generating a first power model of the host server using the regression model.

In Example 24, the means for collecting the resource utilization information of any one or more of Examples 1-23 optionally includes means for collecting central processor utilization information ($U_{CPU}$) of the host server running the benchmark application container.

In Example 25, the means for collecting the resource utilization information of any one or more of Examples 1-24 optionally includes means for collecting disk input and output utilization information ($U_{Disk}$) of the host server running the benchmark application container.

In Example 26, the means for collecting the resource utilization information of any one or more of Examples 1-25 optionally includes means for collecting memory utilization information ($U_{Mem}$) of the host server running the benchmark application container.

In Example 27, the means building a regression model using the power consumption information and the resource utilization information of any one or more of Examples 1-26 optionally includes means for estimating coefficients of a power model for the host server using the central processor utilization information ($U_{CPU}$), disk input and output utilization ($U_{Disk}$) and the memory utilization information ($U_{Mem}$).

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A control device comprising:
a first interface to a host server;
a second interface to one or more application containers configured to run on the host server; and
processing circuitry configured to:
apply an artificial workload to a benchmark application container;
collect power consumption information of the host server;
collect resource utilization information of the benchmark application container;
build a statistical model using the power consumption information and the resource utilization information; and
generate a first power model of the host server,
wherein a first application container of the one or more application containers is a benchmark application container and a second application container is a real-time application container,
the resource utilization information includes information of the host server while running the benchmark application container including:
central processor utilization information ($U_{CPU}$),
disk input and output utilization information ($U_{Disk}$), and
memory utilization information ($U_{Mem}$), and
the processing circuitry is further configured to:
determine coefficients of the first power model for the host server using the central processor utilization information ($U_{CPU}$), the disk input and output utilization ($U_{Disk}$) and the memory utilization information ($U_{Mem}$) and power consumption of the host server while building the statistical model, the coefficients determined via regression modeling during a training phase using the benchmark application container, each coefficient indicating power consumption of a different component of the host server during the training phase, and
estimate the power consumption ($P_{Ci}$) of the real-time application container using:

$$P_{Ci} = a_{CPU} U_{CPU\_Ci} + b_{Disk} U_{Disk\_Ci} + c_{Disk} U_{Mem\_Ci} + P_H/n,$$

where i is an index associated with the real-time container application of a plurality of real-time container applications, n is the actual number of real-time container applications running on the host, $P_H$ is the idle power of the host, and a, b, c are the coefficients.

2. The control device of claim 1, wherein
the processing circuitry is further configured to refine the coefficients during runtime by a comparison between a combined estimated power of each of the plurality of real-time container applications with a measured power of the host server and a reconciliation between the combined estimated power and the measured power based on the measured power being equal to the combined estimated power.

3. The control device of claim 1, wherein the processing circuitry is further configured to collect an indicator of application-specific operations (useful_operations) performed by the real-time application container over an interval of time (t1–t2) using the second interface.

4. The control device of claim 3, wherein the processing circuitry is further configured to provide an efficiency (E) of the real-time application container ($f_{Ci}$) using the estimate of the power consumption ($P_{Ci}$) and the indicator of application-specific operations, wherein $$Ef_{Ci} = \frac{\text{useful\_operations}_{t1-t2}}{\int_{t2}^{t1} P_c(t)}.$$

5. The control device of claim 1, wherein the processing circuitry is configured to determine the coefficients via linear regression.

6. A non-transitory machine-readable medium including instructions for estimating power consumption of a cloud computing application that, when executed on a machine cause the machine to perform operations configured to:
run a benchmark application container on a host server;
collect power consumption information of the host server;
collect resource utilization information of the benchmark application container using an artificial workload;
build a statistical model using the power consumption information and the resource utilization information; and
provide a first power model of the host server,
wherein the resource utilization information includes information of the host server while running the benchmark application container including:
central processor utilization information ($U_{CPU}$),
disk input and output utilization information ($U_{Disk}$), and
memory utilization information ($U_{Mem}$), and
the instructions cause the machine to perform operations configured to:
determine coefficients of the first power model for the host server using the central processor utilization information ($U_{CPU}$), the disk input and output utilization ($U_{Disk}$) and the memory utilization information ($U_{Mem}$) and power consumption of the host server while building the statistical model, the coefficients determined via regression modeling during a training phase using the benchmark application container, each coefficient indicating power consumption of a different component of the host server during the training phase, and
estimate the power consumption ($P_{Ci}$) of a real-time application container using:

$$P_{Ci} = a_{CPU} U_{CPU\_Ci} + b_{Disk} U_{Disk\_Ci} + c_{Disk} U_{Mem\_Ci} + P_H/n,$$

where i is an index associated with the real-time container application of a plurality of real-time container applications, n is the actual number of real-time container applications running on the host, $P_H$ is the idle power of the host, and a, b, c are the coefficients.

7. The machine-readable medium of claim 6, further including instructions that, when executed on the machine, cause the machine to perform operations including operations to refine the coefficients during runtime by a comparison between a combined estimated power of each of the plurality of real-time container applications with a measured power of the host server and a reconciliation between the combined estimated power and the measured power based on the measured power being equal to the combined estimated power.

8. The machine-readable medium of claim 6, further including instructions that, when executed on the machine, cause the machine to perform operations including collecting an indicator of application-specific operations (useful_operations) performed by a real-time application container over an interval of time (t1–t2).

9. The machine-readable medium of claim 8, including instructions that, when executed on the machine, cause the machine to perform operations including providing an efficiency (E) of the real-time application container ($f_{Ci}$) using the estimate of the power consumption ($P_{Ci}$) and the indicator of application-specific operations, wherein $$Ef_{Ci} = \frac{\text{useful\_operations}_{t1-t2}}{\int_{t2}^{t1} P_c(t)}.$$

10. The machine-readable medium of claim 6, wherein the coefficients are determined via linear regression.

11. A method for estimating power consumption of a cloud computing application, the method comprising:
running a benchmark application container on a host server;
collecting power consumption information of the host server;
collecting resource utilization information of the benchmark application container using an artificial workload;
building a regression model using the power consumption information and the resource utilization information; and
generating a first power model of the host server using the regression model,
wherein the resource utilization information includes information of the host server while running the benchmark application container including:
central processor utilization information ($U_{CPU}$),
disk input and output utilization information ($U_{Disk}$), and
memory utilization information ($U_{Mem}$), and
the method further comprises:
determining coefficients of the first power model for the host server using the central processor utilization information ($U_{CPU}$), the disk input and output utilization ($U_{Disk}$) and the memory utilization information ($U_{Mem}$) and power consumption of the host server while building the statistical model, the coefficients determined via regression modeling during a training phase using the benchmark application container, each coefficient indicating power consumption of a different component of the host server during the training phase, and
estimating the power consumption ($P_{Ci}$) of a real-time application container using:

$$P_{Ci} = a_{CPU} U_{CPU\_Ci} + b_{Disk} U_{Disk\_Ci} + c_{Disk} U_{Mem\_Ci} + P_H/n,$$

where i is an index associated with the real-time container application of a plurality of real-time container appliapplications running on the host, $P_H$ is the idle power of the host, and a, b, c are the coefficients.

12. The method of claim 11, further comprising refining the coefficients during runtime by a comparison between a combined estimated power of each of the plurality of real-time container applications with a measured power of the host server and a reconciliation between the combined estimated power and the measured power based on the measured power being equal to the combined estimated power.

13. The method of claim 11, including:
collecting an indicator of application-specific operations performed by a real-time application container over an interval of time; and
determining an efficiency of the real-time container application using the estimate of the power consumption ($P_{Ci}$) and the indicator of application-specific operations.

14. The method of claim 11, wherein the coefficients are determined via linear regression.

* * * * *